United States Patent
Fluxman et al.

(10) Patent No.: US 7,656,937 B2
(45) Date of Patent: Feb. 2, 2010

(54) METHOD OF PROCESSING SIGNALS WITHIN A "RAKE" RECEIVER HAVING SEVERAL FINGERS DURING A CHANGE OF CONFIGURATION OF THE FINGERS, AND CORRESPONDING "RAKE" RECEIVER

(75) Inventors: Steven Fluxman, Crolles (FR); Benoit Moussu, St-Quentin-sur-Isere (FR)

(73) Assignee: ST Microelectronics SA, Montrouge (FR)

( * ) Notice: Subject to any disclaimer, the term of this patent is extended or adjusted under 35 U.S.C. 154(b) by 444 days.

(21) Appl. No.: 11/149,734

(22) Filed: Jun. 9, 2005

(65) Prior Publication Data

US 2006/0018366 A1    Jan. 26, 2006

(30) Foreign Application Priority Data

Jun. 10, 2004    (FR)    .................................. 04 06259

(51) Int. Cl.
*H04B 1/00*    (2006.01)

(52) U.S. Cl. ........................ 375/148; 375/147; 375/150; 375/140; 375/130

(58) Field of Classification Search ................. 375/148, 375/147, 150
See application file for complete search history.

(56) References Cited

U.S. PATENT DOCUMENTS

| 6,377,614 | B1 |   | 4/2002 | Yamashita |         |
|-----------|----|---|--------|-----------|---------|
| 7,340,017 | B1 | * | 3/2008 | Banerjee  | 375/348 |
| 2003/0013457 | A1 |   | 1/2003 | Amerga et al. | |
| 2003/0048833 | A1 | * | 3/2003 | Araya et al. | 375/147 |
| 2003/0142726 | A1 | * | 7/2003 | Eltawil et al. | 375/146 |
| 2004/0109494 | A1 | * | 6/2004 | Kindred et al. | 375/148 |
| 2004/0233977 | A1 | * | 11/2004 | Kang | 375/148 |
| 2004/0240532 | A1 | * | 12/2004 | Reznik et al. | 375/148 |
| 2006/0245478 | A1 | * | 11/2006 | Chen et al. | 375/148 |
| 2007/0127556 | A1 | * | 6/2007 | Sato | 375/148 |

FOREIGN PATENT DOCUMENTS

| EP | 1 182 795 | 2/2002 |
|----|-----------|--------|
| EP | 1 339 172 | 8/2003 |

OTHER PUBLICATIONS

French Preliminary Search Report dated Feb. 7, 2005 for French Application No. 04 06259.

* cited by examiner

*Primary Examiner*—Shuwang Liu
*Assistant Examiner*—Kenneth Lam
(74) *Attorney, Agent, or Firm*—Lisa K. Jorgenson; Jose Gutman; Fleit Gibbons Gutman Bongini & Bianco P.L.

(57) ABSTRACT

In the presence of an indication of change of configuration containing the characteristics of a new configuration of fingers of a "Rake" receiver, continue performing the combination by using the old configuration (fng1, fng2, fng3) and, only when all the fingers of the new configuration have delivered information, the combination is performed by using the new configuration (fng1, fng3, fng4).

5 Claims, 8 Drawing Sheets

PRIOR ART

METHOD OF PROCESSING SIGNALS WITHIN A "RAKE" RECEIVER HAVING SEVERAL FINGERS DURING A CHANGE OF CONFIGURATION OF THE FINGERS, AND CORRESPONDING "RAKE" RECEIVER

CROSS-REFERENCE TO RELATED APPLICATION

This application is based upon and claims priority from prior French Patent Application No. 0406259, filed on Jun. 10, 2004, the entire disclosure of which is herein incorporated by reference.

BACKGROUND OF THE INVENTION

1. Field of the Invention

The invention relates to the processing of incident signals within a signal receiver. The invention therefore applies advantageously to a receiver which combines several components of multi-path signals mutually delayed by different time delays before reaching the receiver. Such a receiver is for example present in code division multiple access (CDMA system) wireless communication systems and is currently designated by those skilled in the art by the name of "Rake" receiver. The invention relates more particularly to the processing of the signals within a "Rake" receiver during a change of configuration of the fingers of the receiver.

2. Description of the Related Art

In a wireless communication system, a base station communicates with a plurality of remote terminals, such as cellular mobile telephones. Frequency division multiple access (FDMA) and time division multiple access (TDMA) are the conventional multiple access systems for delivering simultaneous services to a certain number of terminals. The basic idea underlying the FDMA and TDMA systems consists in dividing the available resource, respectively into several frequencies or into several time slots, such that several terminals can operate simultaneously without causing interference.

Telephones operating according to the GSM standard belong to the FDMA and TDMA systems in the sense that transmission and reception take place at different frequencies and also in different time slots.

Unlike these systems using frequency division or time division, CDMA systems (code division multiple access) enable the multiple users to share a common frequency and a common time channel by using a coded modulation. Amongst the CDMA systems we can cite the CDMA 2000 system, the WCDMA system (wide band CDMA) or the IS-95 standard.

In CDMA systems, as is well known to those skilled in the art, a scrambling code is associated with each base station and is used to distinguish one base station from another. In addition, an orthogonal code, known to those skilled in the art as the OVSF code, is allocated to each remote terminal (such as for example a cellular mobile telephone). All the OVSF codes are mutually orthogonal which distinguishes one channel from another.

Before transmitting a signal over the transmission channel to a remote terminal, the signal has been scrambled and spread by the base station using the scrambling code of the base station and the OVSF code of the channel.

In CDMA systems, we can still distinguish those that use a distinct frequency for transmission and reception (CDMA-FDD system) from those which use a common frequency for transmission and reception, but distinct time domains for transmission and reception (CDMA-TDD system).

The invention applies advantageously to communication systems of the CDMA type and more particularly to systems of the WCDMA type with terrestrial radio access (UTRA FDD/TDD).

The incident signal received by a mobile telephone for example comprises different versions delayed in time from the signal initially transmitted, which versions are the result of the multi-path transmission characteristics of the transmission environment between a base station and the telephone. And each path introduces a different delay.

The "Rake" receiver in a cellular mobile telephone operating in a CDMA communication system is used to carry out temporal alignment, descrambling, despreading, channel correction and combination of the delayed versions of the initial signals in order to deliver the information streams (symbols) contained in the initial signals.

A "Rake" receiver is generally formed of several "fingers". Each finger is intended to demodulate a given path received at a given instant. The baseband demodulation consists essentially in a descrambling and a despreading. Next, the signal after despreading undergoes a channel correction, generally consisting of a phase correction and an amplitude correction. All these operations relating to demodulation are performed, within each finger, in several demodulation units respectively associated with various physical transmission channels.

To perform the combination of the delayed versions of the initial signals, a "Rake" receiver conventionally performs in theory the summation of the contributions delivered as output from all the fingers, in a static manner. Stated otherwise, the fingers are assumed to be active all the time and the configuration of the fingers is assumed not to change. Also, if fingers nevertheless have to be activated or deactivated, that is to say if the configuration of the fingers has to be modified, then this must be performed in theory at an appropriate moment in time.

Having said this, in practice, and in conventional "Rake" receivers, this static theoretical behavior cannot be guaranteed since the drive unit RMU (Rake Management Unit) will in general change the configuration of the fingers by adding or removing fingers in an arbitrary manner so as to optimize performance. However, when adding or removing these fingers in an arbitrary manner, a loss of symbols generally occurs, leading to errors.

FIG. 1 illustrates such a drawback.

More precisely, in this figure is considered an initial configuration in which three fingers, for example the fingers fng1, fng2 and fng3, are active. Next, at a given instant, the configuration of the fingers changes through the removal of the finger fng2 and the addition of a new finger, namely the finger fng4.

Represented in FIG. 1 are the relative instants of arrival of the outputs of the fingers (contribution of the symbols) and the result of the combination at the output of the means of combination.

The references $S_i$ at the bottom of the figure designate the symbols at the output of the means of combination while in the remainder of the figure the references $S_i$ designate the contributions of the various fingers in respect of these symbols.

Thus, in this example, before the arrival of the fifth symbol (contribution) S4 at the finger fng1, the finger fng2 is replaced with the finger fng4.

On account of the latency of the finger fng4, that is to say the time required for this finger to deliver a symbol contribution, two symbol contributions of this finger, namely the contributions of symbols S4 and S5, are missing. Consequently, and since in this example the finger fng4 is delayed by more than a symbol with respect to the other fingers, the symbols S3 and S4 emanating from the means of combination are formed only from the contributions stemming from the fingers fng1 and fng3.

Moreover, the symbol S5, and in fact all the following symbols, is composed of a mixture of contributions corresponding to different symbols (the symbol S5 emanating from the finger fng1, the symbol S5 emanating from the finger fng3 and the symbol S6 emanating from the finger fng4) and, consequently, this results in an error at the output of the means of combination.

Numerous situations may thus arise as a function in particular of the spreading factor, of the instant of modification of the configuration, of the finger considered, etc. with more or less serious consequences for the performance of the "Rake" receiver.

Accordingly, there exists a need for overcoming the disadvantages of the prior art as discussed above.

SUMMARY OF THE INVENTION

The invention aims to afford a solution to this problem.

The solution to this problem resides in a synchronization of the updating of the configuration of the fingers, with the means of combination ("combiner", according to the terminology customarily used by the person skilled in the art).

More precisely, the invention aims to ensure that the configuration of the means of combination is only updated when all the new fingers have been activated and/or when the old fingers have been deactivated. Thus, the contributions of the fingers relating to the same symbols are always added.

Stated otherwise, the invention proposes a method of processing an incident signal within a "Rake" receiver having several fingers, comprising a reception of the incident signal formed of symbols emanating from at least one multi-path transmission channel, each path of which conveys a delayed version of the signal, a detection of the paths and the formulation of a configuration comprising an allocation of fingers to these paths with an indication of a last finger for this configuration, and a combination of the information (contributions) delivered as output from each finger of the configuration.

According to a general characteristic of the invention, in the presence of an indication (generally software) of change of configuration containing the characteristics of a new configuration, one continues performing the combination by using the old configuration and, only when all the fingers of this new configuration have delivered information (contribution), the combination is performed by using the new configuration.

Stated otherwise, the configuration of the means of combination ("combiner") is effective only when all the fingers belonging to the new configuration, that is to say from the first finger to the last finger, have delivered their first contribution.

It is recalled here that the first finger is the finger which corresponds to the most advanced path while the last finger is the finger that corresponds to the most delayed path.

The invention also proposes a "Rake" receiver, comprising a signal input for receiving an incident signal formed of symbols emanating from at least one multi-path transmission channel, each path of which conveys a delayed version of the signal, several fingers each intended to demodulate a given path at a given instant, a drive unit intended to detect the paths and to define a configuration of fingers by allocating the paths to certain at least one of the fingers, and means of combination, connected to the output of the fingers, and intended to sum the information delivered as output from each finger belonging to the configuration. According to a general characteristic of the invention, the means of combination comprise control means able in the presence of an indication of change of configuration in the allocation of the fingers to authorize the deactivation of any fingers no longer belonging to the new configuration only when all the fingers of this new configuration have delivered information.

The invention also proposes a component of a wireless communication system, for example a cellular mobile telephone, incorporating a receiver as defined hereinabove.

BRIEF DESCRIPTION OF THE DRAWINGS

Other advantages and characteristics of the invention will become apparent on examining the detailed description of modes of implementation and embodiment, which are in no way limiting, and of the appended drawings, in which.

DETAILED DESCRIPTION

Figure 2:
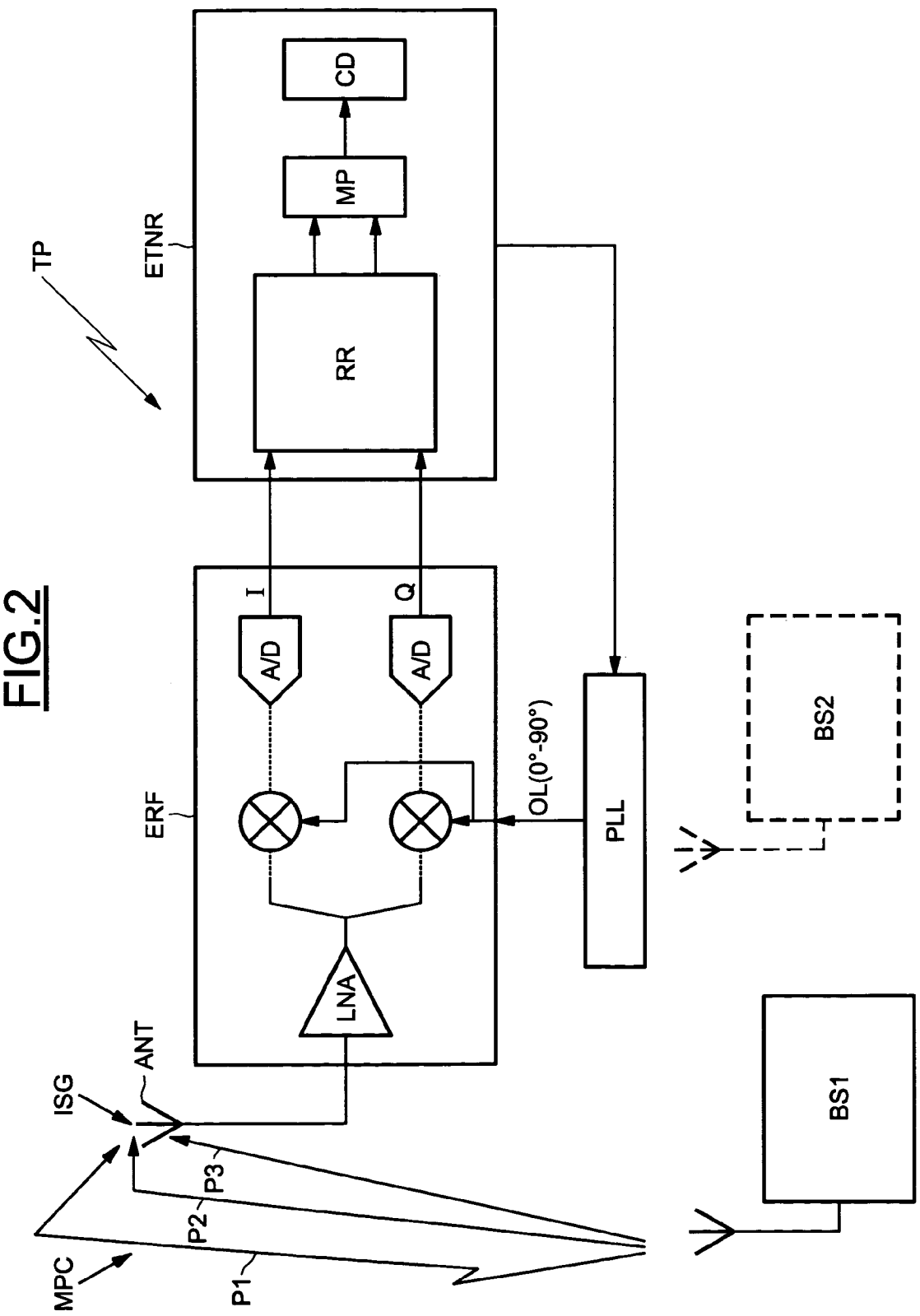

In FIG. 2, the reference TP designates a remote terminal, such as a cellular mobile telephone, which is in communication with a base station BS1, for example according to a communication scheme of the CDMA-FDD type.

The cellular mobile telephone comprises, in conventional fashion, an analog radiofrequency stage ERF connected to an antenna ANT to receive an input signal ISG.

Conventionally, the ERF stage comprises a low noise amplifier LNA and two processing channels comprising mixers, filters and conventional amplifiers (not represented in FIG. 2 for simplicity purposes). The two mixers respectively receive from a phase locked loop PLL two signals mutually presenting a phase difference of 90°. After frequency transposition in the mixers, the two processing channels respectively define two streams I (direct stream) and Q (quadrature phase stream) according to a denomination well known to those skilled in the art.

After digital conversion in analog/digital converters, the two streams I and Q are delivered to a reception processing stage ETNR.

This processing stage ETNR comprises a receiver RR, commonly called by those skilled in the art a "Rake receiver", followed by conventional means of demodulation MP which demodulate the constellation delivered by the Rake receiver RR. The means MP are followed by a conventional channel decoder CD.

Because of possible reflections of the signal initially transmitted on obstacles situated between the base station and the mobile telephone, the transmission environment is in fact a multi-path transmission environment MPC, that is comprising several different transmission paths (three transmission paths P1, P2, P3 are shown in FIG. 2). In consequence, the signal ISG which is received by the mobile telephone comprises different versions delayed in time from the signal initially transmitted, versions which are the result of the characteristics of multi-path transmission of the transmission environment. And, each path introduces a different delay. Naturally, the received signal ISG could also result from the transmission of initial signals respectively transmitted by different base stations BS1 and BS2.

Figure 3:
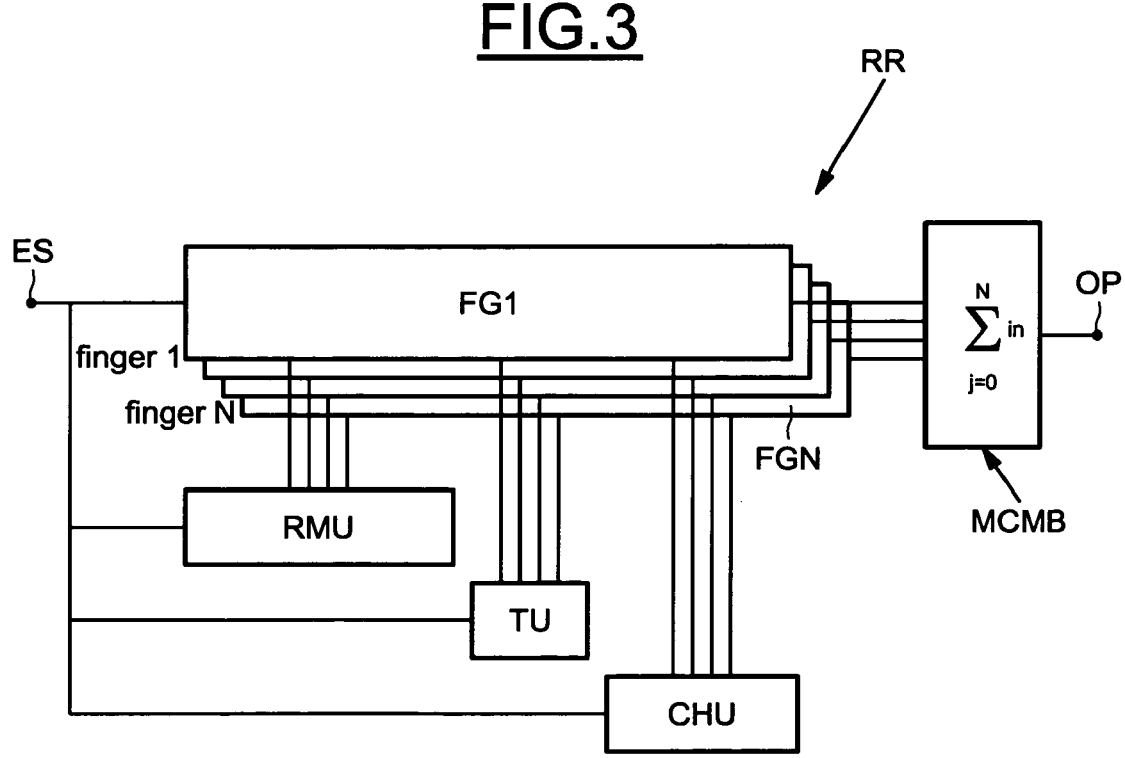

FIG. 3 illustrates schematically the basic functionalities of the "Rake" receiver RR.

The latter is formed of several fingers (here N fingers) fg1-fgn. Each finger is designed to demodulate a given path received at a given moment and comprises several demodulators, each demodulator being assigned to a physical transmission channel. Baseband demodulation essentially consists in a descrambling and a despreading. The despreading is in reality a correlation and so requires an integration over the symbol period. The receiver then combines the information (contributions) received on each finger in means of combination MCMB, by summing them after having corrected the phase and amplitude distortions of each path (unit CHU described below). Naturally, the multiple fingers represented in FIG. 3 may be formed of the same physical finger, reconfigured N times to produce the N functional fingers.

The receiver also comprises a unit CHU capable of supplying a transmission channel estimate, with the aim notably of correcting the channel distortions.

It is necessary to detect the paths having the greatest energy and to allocate them to the fingers. This is performed by a drive unit RMU of known structure.

Finally, since the timing relating to the paths may vary over time, a tracking unit also of known structure monitors the timing of the paths and updates the fingers with this information.

Figure 4:
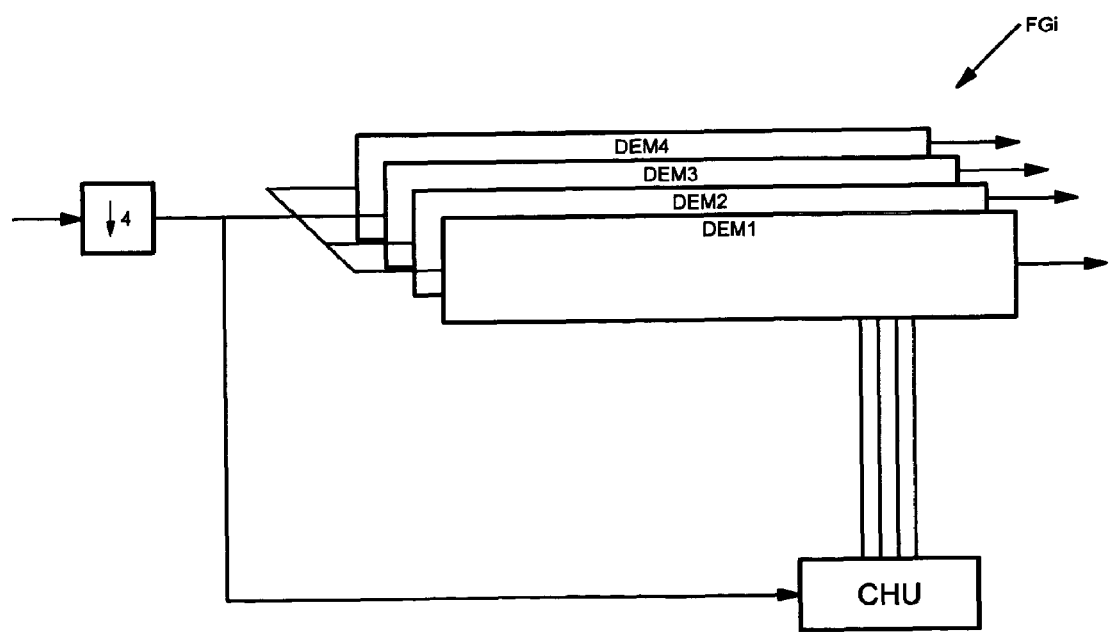

In FIG. 4, we see that each finger FGi comprises a code generator CG capable of producing in particular the scrambling codes and the OVSF codes, a sub-sampler, in this instance a sub-sampler by four, disposed at the input of the finger, as well as a channel estimation unit CHU.

Furthermore, the finger FGi comprises several physical transmission channel demodulators, in this instance four demodulators DEM1-DEM4. Each channel demodulator performs the functions of descrambling, despreading and integration as well as the previously mentioned channel correction functions. The unit CHU is shared by all the physical transmission channels.

Figure 5:
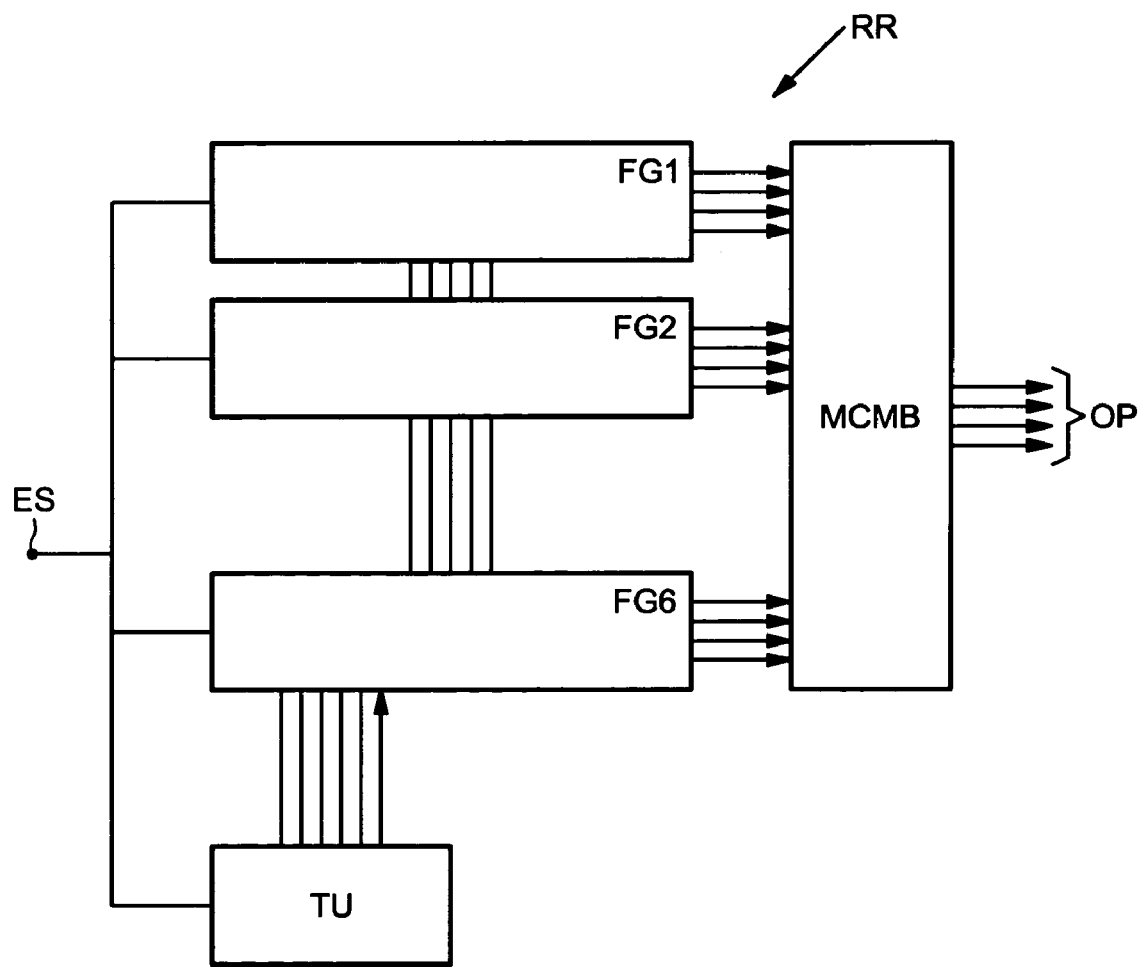

If we now refer to FIG. 5, which partially illustrates an example of internal architecture of a "Rake" receiver RR according to the invention, we see that there are between the signal input ES and the output OP which delivers the information relating to the different physical transmission channels (in this instance four physical channels) the fingers of the receiver, here six fingers FG1-FG6, connected at the output to means of combination MCMB of conventional structure known per se, and intended to combine the delayed versions of the initial signals, so as to deliver the symbols contained in initial signals.

These means of combination MCMB here consist in fact of as many combination units as there are physical channels. A combination unit is connected in fact to the six homologous demodulators respectively contained in the six fingers FG1-FG6.

Such a combination unit is for example that described in French Patent Application No. 0212025 in the name of the applicant.

Figure 1:
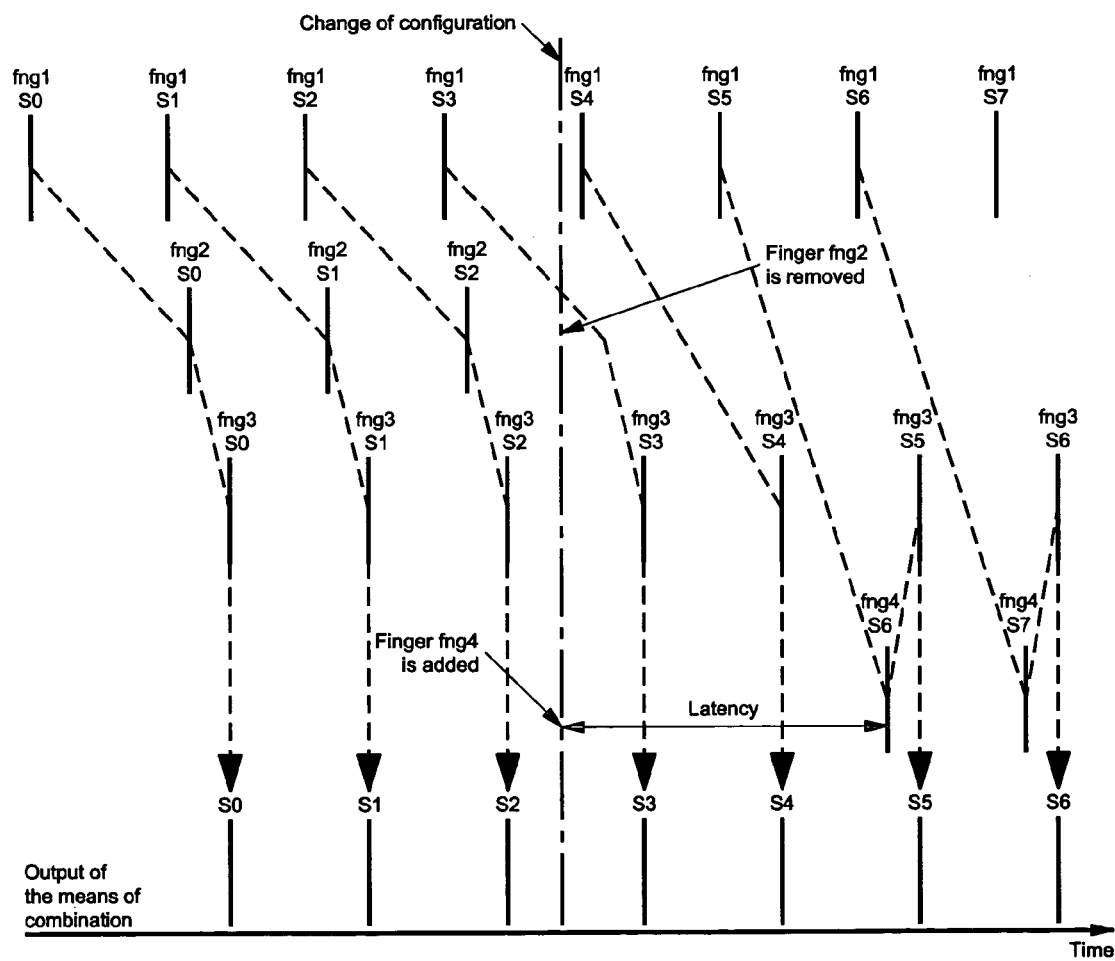
FIG. 1, already described, diagrammatically illustrates a recombination of symbols in the case of a change of configuration in a "Rake" receiver of the prior art, FIG. 2 diagrammatically illustrates a cellular mobile telephone according to the invention, incorporating a "Rake" receiver according to the invention, FIGS. 3 to 5 diagrammatically illustrate the functionalities and an internal architecture of a "Rake" receiver according to the invention, FIG. 6 diagrammatically illustrates the recombination of symbols in the case of a change of configuration within a "Rake" receiver according to the invention.
Figure 6:
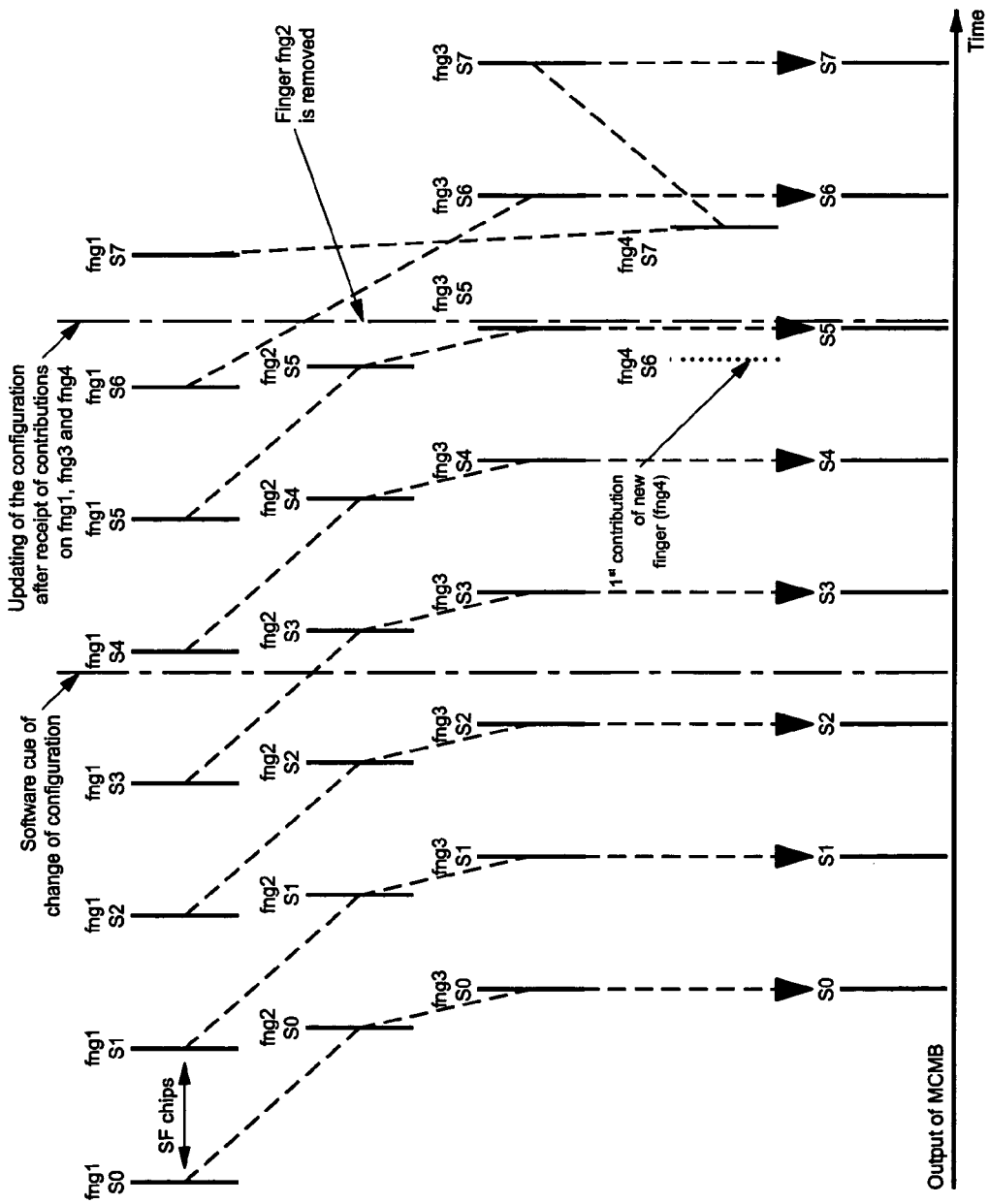

FIG. 6 illustrates the same kind of case as FIG. 1, that is to say the initial configuration "finger fng1; finger fng2; finger fng3" is replaced with the new configuration "finger fng1; finger fng3; finger fng4".

FIG. 6 shows that, in the presence of a change-of-configuration information delivered in a software manner by the unit RMU, the combination of the symbols continues to be performed with the fingers of the old configuration until all the fingers of the new configuration, and in this instance in particular the new finger FNG4, have delivered their contribution. Also, only after the receipt of the contributions of the new fingers fng1, fng3 and fng4, the configuration is updated and the means of combination may then perform the combination with the fingers fng1, fng3 and fng4, the finger fng2 having been deactivated after the updating of this configuration.

It will be noted here that the finger fng2 is consequently still activated during three symbols and that the contribution of the finger fng4 is taken into account one symbol later since the updating of the configuration is performed only after receipt of the first contribution of the new finger.

Since this updating is triggered by the arrival of the output of the new finger, the latency of fingers is automatically taken into account and the error in the number of symbols is always the same (one).

Consequently, the means of combination can take it into account during the summation of the contribution of the fingers.

The invention is thus applied most particularly in an advantageous manner to means of combination of the type of those described in the aforementioned French patent application requiring a memory of reduced size and a reduced operating frequency, as well as a single adder of the size of a symbol. The person skilled in the art may refer to this French patent application for all useful purposes. Certain important aspects thereof are recalled here.

More precisely, the memory means is capable of storing a greater number of symbols than the maximum delay between the paths (expressed as a number of symbols) and is addressable by address pointers respectively associated with the fingers.

The combination step then comprises a steady state phase in which the address pointers point to addresses that are mutually spaced apart having regard to the mutual delays between the paths.

Moreover, in this combination step, a current symbol received on a first finger is stored in the memory at the write address designated by the corresponding address pointer, and this address pointer is incremented.

Also, before the receipt of the following symbol on this first finger, the memory contents stored at the read addresses respectively designated by all the other address pointers are extracted successively, these contents are summed respectively with the symbols present on the other fingers, and then these sums are respectively stored with the exception of those corresponding to the last finger, at the same read addresses, before incrementing all the other pointers (including the pointer corresponding to the last finger).

The last sum corresponding to the last finger is then delivered as output from the receiver.

In the invention, the synchronization between the unit RMU and the means of combination is manifested by the delivery by the unit RMU of the offset of each new finger with respect to the last finger just after the incrementation of the pointer of the last finger, and by the calculation by the means of combination of the pointer of the new finger by adding the offset to the pointer of the last finger just after its incrementation.

Stated otherwise, the unit RMU gives the means of combination the position of the contribution of each finger in the memory with respect to the last finger. Hence, since the configuration is updated just after having received the contribution of the last finger, the means of combination MCMB can add the offset of the new finger (fng4 in this example) to the pointer of the last finger and thus calculate the pointer of this new finger.

Thus, stated otherwise, in the present case, the means of combination knows that the contribution corresponding to the symbol S7 on the finger fng4 does not form part of the symbol S6 and the contribution of the symbol fng4 will thus be placed in the correct location in the memory in order for the symbol S7 to be taken into account.

It will be noted finally that in FIG. 6 the symbol S6 resulting from the combination is composed of the contributions stemming only from the fingers fng1 and fng3. The finger fng4 does not contribute to this symbol. Having said this, this is not detrimental since it only entails a contribution from among several which will lead only to a slightly lower signal-to-noise ratio but in no case to an error.

Figure 7:
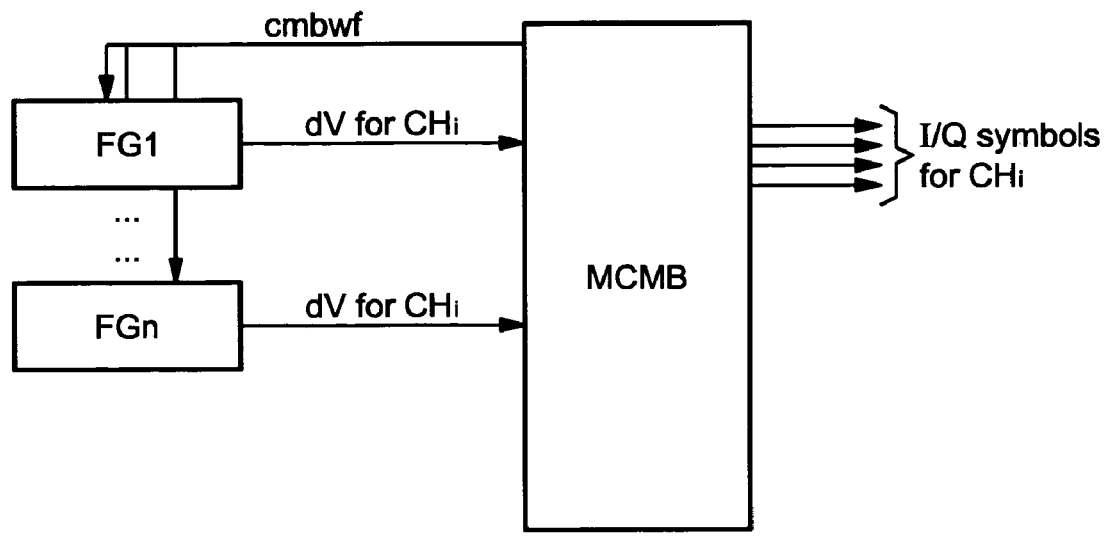
FIGS. 7 and 8 illustrate more particularly but still diagrammatically certain parts of the "Rake" receiver according to the invention.

The synchronization between the fingers and the means of combination MCMB is carried out in particular by control signals between the fingers and these means of combination, as illustrated in particular in FIG. 7.

More precisely, each finger FGi delivers for all the physical transmission channels CHi, in addition to the complex symbols (I/Q), control signals DV which are representative of the validity of data delivered, and which in practice are pulses which indicate the presence of a data item at the output of the corresponding finger.

In the contrary direction, that is to say from the means of combination MCMB to the fingers, there circulates a signal cmbwf (cmb wait finger) which prevents the deactivation of a finger until this finger has been replaced in the means of combination with another finger. When this signal takes a low logic value (for example), the corresponding fingers may be deactivated.

Figure 8:
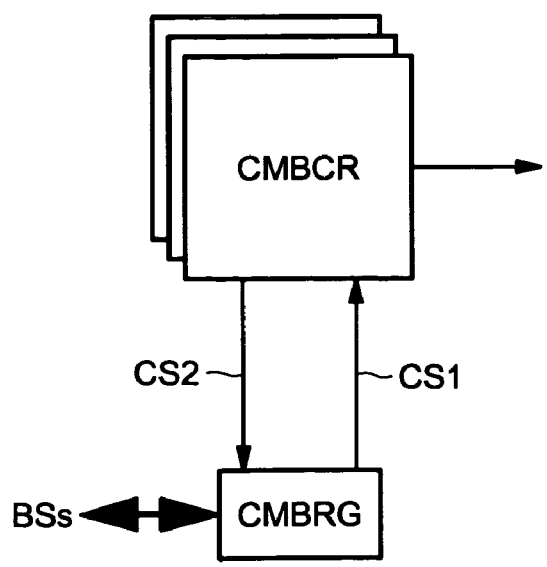

As illustrated in FIG. 8, internally the means of combination MCMB may be regarded as being divided into several cores or combination units CMBCR (one per physical transmission channel CHi), which perform the combination processing, as well as into a block of registers CMBRG which contains all the registers relating to the means of combination MCMB.

The signalling between each core CMBCR and the block of registers is performed by way of a certain number of control signals that will now be detailed.

These control signals may be classed into a first family CS1 which are the signals which go from the block of registers CMBRG to the cores of the means of combination and a second family CS2 which are the control signals delivered by the cores of the means of combination heading for registers.

Moreover, the block of registers CMBRG receives bus signals BSS.

In the family of signals CS1, there figures in particular a signal rgwl (rg-wait-last) indicating that the corresponding core CMBCR must wait for the receipt of a signal of valid data DV on all the new fingers before updating another control signal cwl (core-wait-last) the meaning of which will be returned to in greater detail hereinafter. There is a control signal rgwl per physical transmission channel CHi.

Also found in the family CS1 is a control signal rgnl (rg-new-last) indicating the new last finger, that is to say the finger which will be the last finger after the change of configuration.

Another control signal rgl (rg-last) indicates between the old last finger and the new last finger, which one is actually temporally the last.

A control signal rgnf (rg-new-finger) indicates any new finger, that is to say a finger which will be active after the change of configuration.

Finally, a control signal cmbcfgc (cmb-cfg-change) indicates that the change of configuration has been performed.

Among the control signals belonging to the family CS2 is found in particular a signal cmbcb (cmb-core-busy) indicating that the corresponding core is active and that consequently no change of configuration can occur. Here again, there exists a signal cmbcb per physical transition channel.

Another signal of the family CS2 is the signal cwl (core-wait-last) mentioned above. When this signal takes the low value, this signifies that all the signals of validity of data DV on all the new fingers have been received. Here again, there is a signal cwl per physical transition channel.

Figure 9:
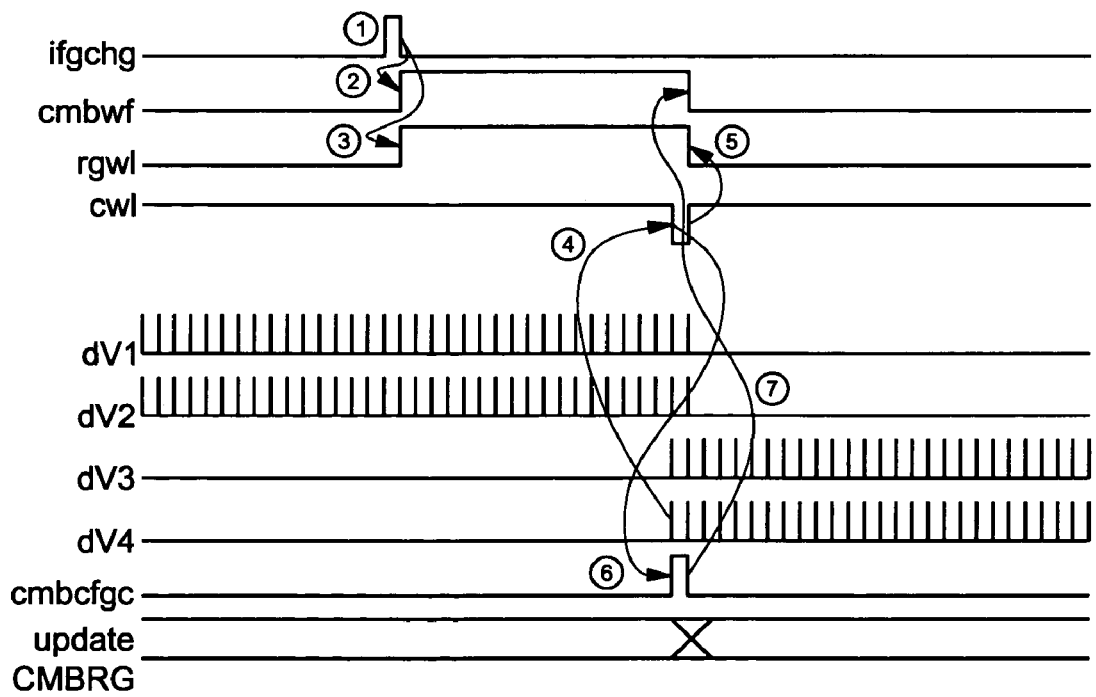
FIG. 9 represents a time chart relating to another exemplary change of configuration of fingers in a "Rake" receiver according to the invention.

An exemplary sequence of control signals is illustrated in FIG. 9 in the case where an initial configuration "finger 1 (first finger) and finger 2 (last finger)" is replaced with a new configuration "finger 3 (new first finger) and finger 4 (new last finger)".

For the sake of simplification, a single transmission channel is represented.

In step 1, the flag ifgchg (i-fingact-chg) goes to the high state when a change of configuration is to be performed (activation and/or deactivation of a finger).

In step 2, this flag triggers the signal cmbwf, preventing the deactivations of the old fingers.

In step 3, the signal rgwl is set to 1, indicating to the core CMBCR that it must wait for the last finger.

In step 4, the signal of valid data DV3-DV4 on a new finger (given by the signal rgnf) and on the last finger is received and the signal cwl is reset to 0.

In step 5, the signal cwl is low for the transmission channel, and the signal rgwl is reset to 0.

In step 6, the signal cwl is low for all the transmission channels, and the signal cmbcfgc is activated.

In step 7, when the signal cmbcfgc is high, the signal cmbwf is reset to 0, permitting the initial fingers to be deactivated. The configuration of the means of combination is then updated.

While there has been illustrated and described what is presently considered to be embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method of processing an incident signal within a "Rake" receiver having several fingers, comprising:

reception of the incident signal formed of symbols emanating from at least one multi-path transmission channel, each path of which conveys a delayed version of the incident signal;

detection of the paths and formulation of a configuration comprising an allocation of fingers to the paths with an indication of a last finger for the configuration, wherein each finger having an output, and wherein each configuration is a selective coupling of the output of one or more fingers to be summed as a combination of the information output from such fingers; and combination of the information delivered as output from each finger of the configuration, wherein, in the presence of an indication of change of configuration from a present configuration to a new configuration, continue performing the combination by using the present configuration and, only when all the fingers of the new configuration have delivered information, as indicated by the presence of information at the output of each finger of the new configuration, the combination is performed by using the new configuration.

2. A "Rake" receiver, comprising:

a signal input for receiving an incident signal formed of symbols emanating from at least one multi-path transmission channel, each path of which conveys a delayed version of the signal;

several fingers each for demodulating a given path at a given instant, and each having an output;

a drive unit for detecting the paths and to define a configuration of fingers by allocating the paths to certain at least one of the fingers, wherein each configuration is a selective coupling of the output of one or more fingers to be summed as a combination of information from each output of such fingers; and means of combination, connected to the output of the fingers, for summing information the cues delivered as output from each finger belonging to the configuration, wherein the means of combination comprises control means able in response to an indication of change of configuration in the allocation of the fingers to authorize deactivation of any fingers no longer belonging to a new configuration only when all the fingers of the new configuration have delivered information, as indicated by the presence of information at the output of each finger of the new configuration.

3. The "Rake" receiver of claim 2, wherein the means of combination comprises at least one combination unit being communicatively coupled with a demodulation output of each of the several fingers.

4. A component of a wireless communication system, comprising:

an antenna; and a "Rake" receiver, communicatively coupled with the antenna, the "Rake" receiver comprising:

a signal input for receiving an incident signal formed of symbols emanating from at least one multi-path transmission channel, each path of which conveys a delayed version of the signal;

several fingers each for demodulating a given path at a given instant, and each having an output;

a drive unit for detecting the paths and to define a configuration of fingers by allocating the paths to certain at least one of the fingers, wherein each configuration is a selective coupling of the output of one or more fingers to be summed as a combination of information from each output of such fingers; and means of combination, connected to the output of the fingers, for summing information delivered as output from each finger belonging to the configuration, wherein the means of combination comprises control means able in response to of an indication of change of configuration in the allocation of the fingers to authorize deactivation of any fingers no longer belonging to a new configuration only when all the fingers of the new configuration have delivered information, as indicated by the presence of information at the output of each finger of the new configuration.

5. The component of a wireless communication system according to claim 4, wherein the component comprises a cellular mobile telephone.

* * * * *